US008640834B2

(12) United States Patent
De-La-Fuente-Farias

(10) Patent No.: US 8,640,834 B2
(45) Date of Patent: Feb. 4, 2014

(54) CONNECTING ROD

(75) Inventor: Jorge-Alberto De-La-Fuente-Farias, Monterrey (MX)

(73) Assignee: Stucki de Mexico, S. de R.L. de C.V., Monterrey, N.L. (MX)

( * ) Notice: Subject to any disclaimer, the term of this patent is extended or adjusted under 35 U.S.C. 154(b) by 348 days.

(21) Appl. No.: 13/102,572

(22) Filed: May 6, 2011

(65) Prior Publication Data

US 2011/0272226 A1 Nov. 10, 2011

Related U.S. Application Data

(60) Provisional application No. 61/331,942, filed on May 6, 2010.

(51) Int. Cl.
*F16D 65/16* (2006.01)

(52) U.S. Cl.
USPC .................................... 188/206 R; 188/219.1

(58) Field of Classification Search
USPC ..................... 188/204 R, 206 R, 219.1, 229.1
See application file for complete search history.

(56) References Cited

U.S. PATENT DOCUMENTS

| | | | | |
|---|---|---|---|---|
| 4,079,818 | A * | 3/1978 | Chierici | 188/207 |
| 4,766,980 | A * | 8/1988 | Engle | 188/52 |
| 5,785,159 | A * | 7/1998 | Jackson et al. | 188/219.1 |
| 7,314,123 | B2 * | 1/2008 | Sakashita et al. | 188/204 R |
| 7,472,775 | B2 * | 1/2009 | Tuten | 188/52 |
| 2011/0108376 | A1 * | 5/2011 | Call et al. | 188/151 R |

* cited by examiner

*Primary Examiner* — Christopher Schwartz
(74) *Attorney, Agent, or Firm* — Young & Thompson

(57) ABSTRACT

A connecting rod utilized to operate brake levers and brake beams in brake riggings of railway cars including a hollow steel pipe having a first and a second open end and linking element inserted at each open end of the hollow steel pipe and joined thereof by a pressure fit joint without the need of adding further materials or welding both elements and without the need of casting a single piece which is very common in the art.

10 Claims, 7 Drawing Sheets

CONNECTING ROD

BACKGROUND OF THE INVENTION

A. Field of the Invention

The present invention is related to connecting rods for railway brake riggings, extending beneath the bolster for transferring a force to the braking mechanism, and more particularly to a connecting rod in which it's linking means are joined at each end by means of a pressure fit joint.

B. Description of the Related Art

In a typical railway freight car, an air cylinder is connected by an assortment of levers and rods to brake beams associated with each pair of wheels. In many cases, a connecting rod extends beneath the bolster of the railway truck connecting both brake beams by means of a lever system.

Most connecting rods actually in use are completely casted in a single piece, which makes them very heavy and difficult to handle. Other connecting rods are comprised by a hollow steel pipe, and have its linking means either welded to each end of the hollow steel pipe or joined by any other known means, which reduce the strength of the connecting rod.

In view of the above referred problem, applicant developed a connecting rod in which it's linking means are joined at each end by means of a pressure fit joint.

The connecting rod of the present invention comprises a hollow steel pipe having a first and a second open end and linking means inserted at each open end of the hollow steel pipe and joined thereof by means of a pressure fit joint.

Each linking means has a cylindrical shaped coupling section having a specific profile forming a peripheral bump section and at least one annular groove so that each cylindrical shaped coupling section is inserted in a correspondent open end until the edge of each open end bumps against said peripheral bump section, and the walls thereof conforms to the profile of the correspondent cylindrical receiving section, thus retaining the correspondent linking means.

The connecting rod of the present invention is a low cost alternative to common connecting rods for mechanical rigging systems, since the linking means are joined to the ends of the hollow bar by means of a pressure fit joint, without the need of adding further materials or welding both elements and without the need of casting a single piece which is very common in the art.

Furthermore, the connecting rod of the present invention is lighter and stronger than a casted connecting rod, since the connecting rod of the present invention is comprised by a hollow rod. The lighter weight will also contribute to reduce wear on pinned connections.

SUMMARY OF THE INVENTION

It is therefore a main object of the present invention to provide a connecting rod comprising a hollow steel pipe having a first and a second open end and linking means inserted at each open end of the hollow steel pipe and joined thereof by means of a pressure fit joint without the need of adding further materials or welding both elements and without the need of casting a single piece which is very common in the art.

It is another object of the present invention to provide a connecting rod of the above referred nature which is lighter and stronger than a casted connecting rod, since the connecting rod of the present invention is comprised by a hollow rod, thus contributing to reduce wear on pinned connections.

These and other objects and advantages of the connecting rod of the present invention will become apparent to those persons having an ordinary skill in the art, from the following detailed description of the embodiments of the invention which will be made with reference to the accompanying drawings.

DETAILED DESCRIPTION OF THE INVENTION

Figure 1:
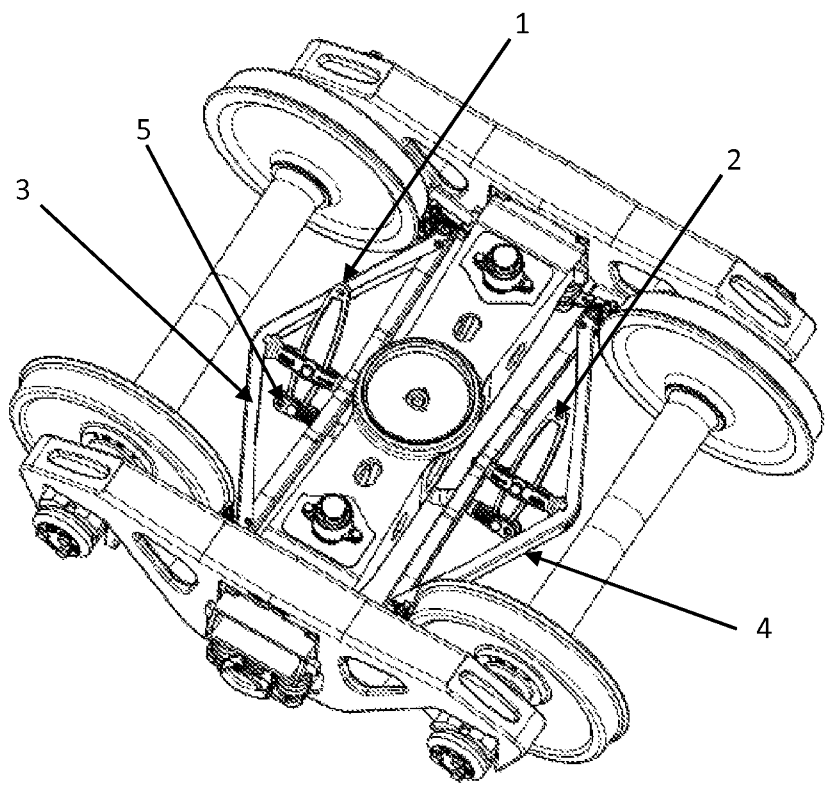
FIG. 1 is an upper perspective view of the truck of a railway car showing its brake rigging and the connecting rod of the present invention installed in the truck.
Figure 2:
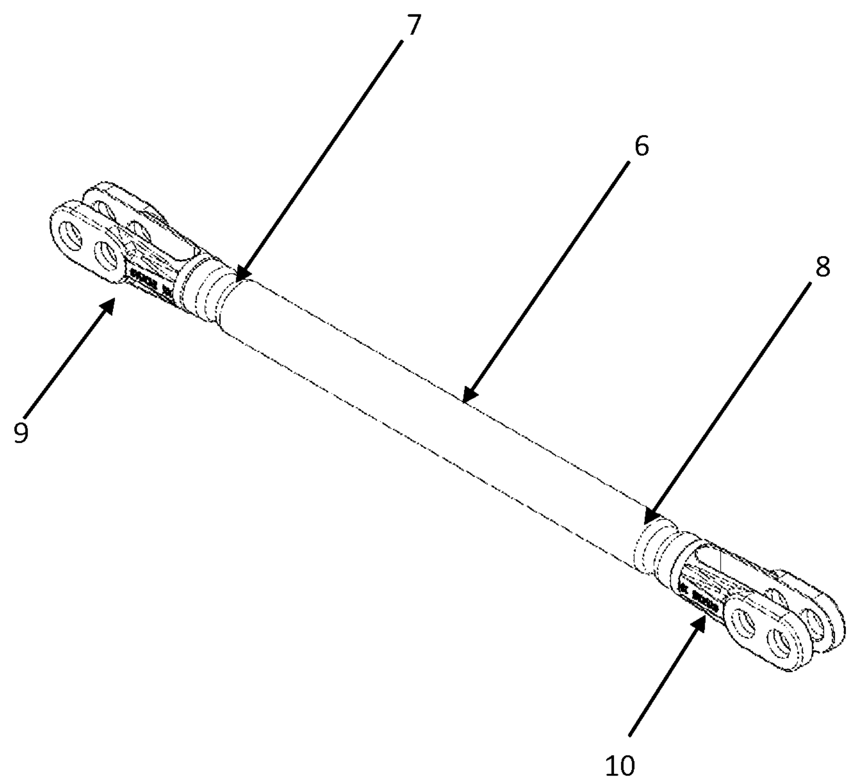
FIG. 2 is a perspective view of a first embodiment of the connecting rod of the present invention.

The connecting rod of the present invention will be described with reference to the accompanying drawings, using reference numbers to identify the constitutive parts of the connecting rod, shown in the drawings which illustrate the preferred embodiments of the invention.

In common brake riggings (FIG. 1), a body mounted brake cylinder (not shown) is provided to move a top rod, which operates the brake levers 1, 2 and the brake beams 3 and 4. A connecting rod 5 is used to operate the brake levers 1, 2 and brake beams 3, 4 on the outboard side of the bolster.

In the most general embodiment the connecting rod of the present invention comprises:

a hollow steel pipe having a first and a second open end and linking means having a coupling section having a specific annular profile inserted at each open end of the hollow steel pipe and joined thereof by means of a pressure fit joint in such way that the walls of the correspondent open end conforms to the specific profile of the correspondent coupling section, without the need of adding further materials or welding both elements and without the need of casting a single piece which is very common in the art.

The pressure fit joint is formed by the application of a mechanical press fit by means of a die having the same shape as the profile of the correspondent coupling section. In such way, the walls of the open ends of the hollow rod are pressed against the coupling sections and conform to the shape of their annular profiles, thus avoiding longitudinally displacement of the coupling section.

Figure 3:
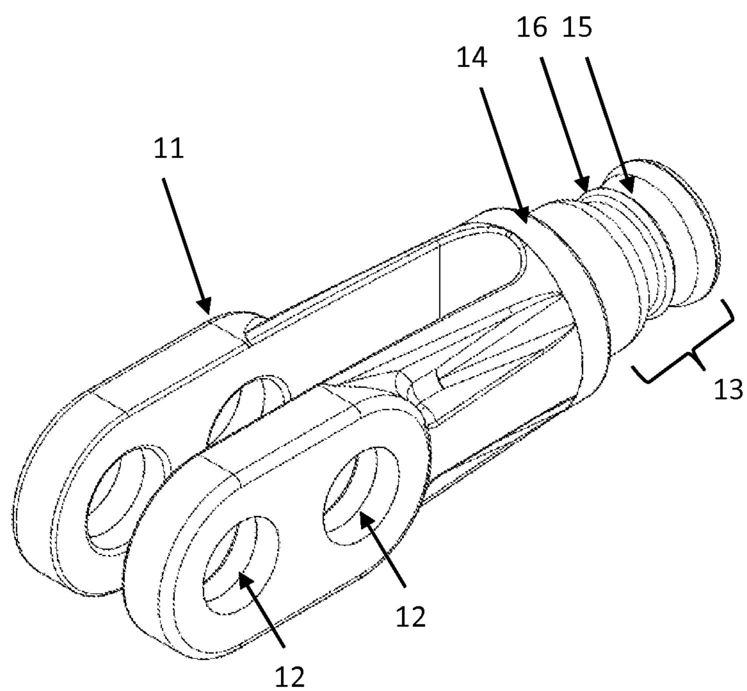
FIG. 3 is a perspective view of the first linking means of a first embodiment of the connecting rod of the present invention.
Figure 4:
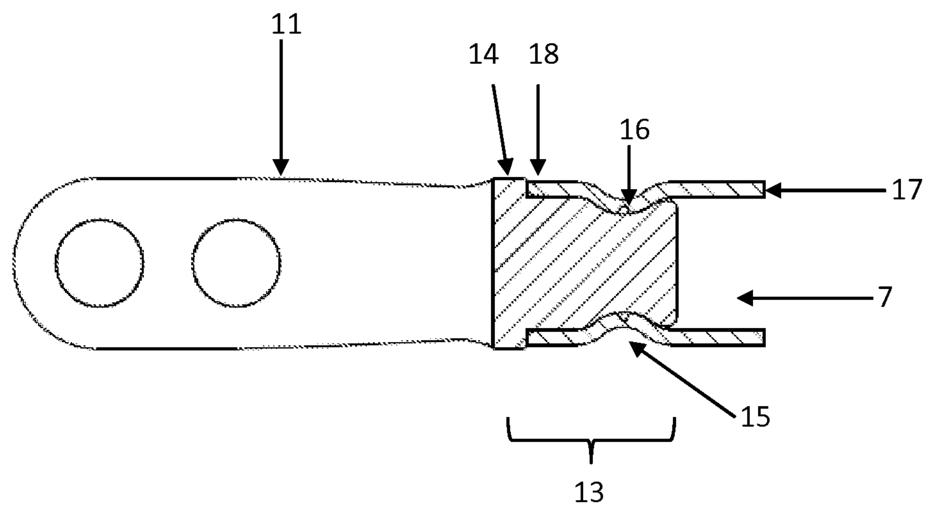
FIG. 4 is a view of a longitudinal cut of the first open end and of the first linking means joined to said first open end of a first embodiment of the connecting rod of the present invention.
Figure 5:
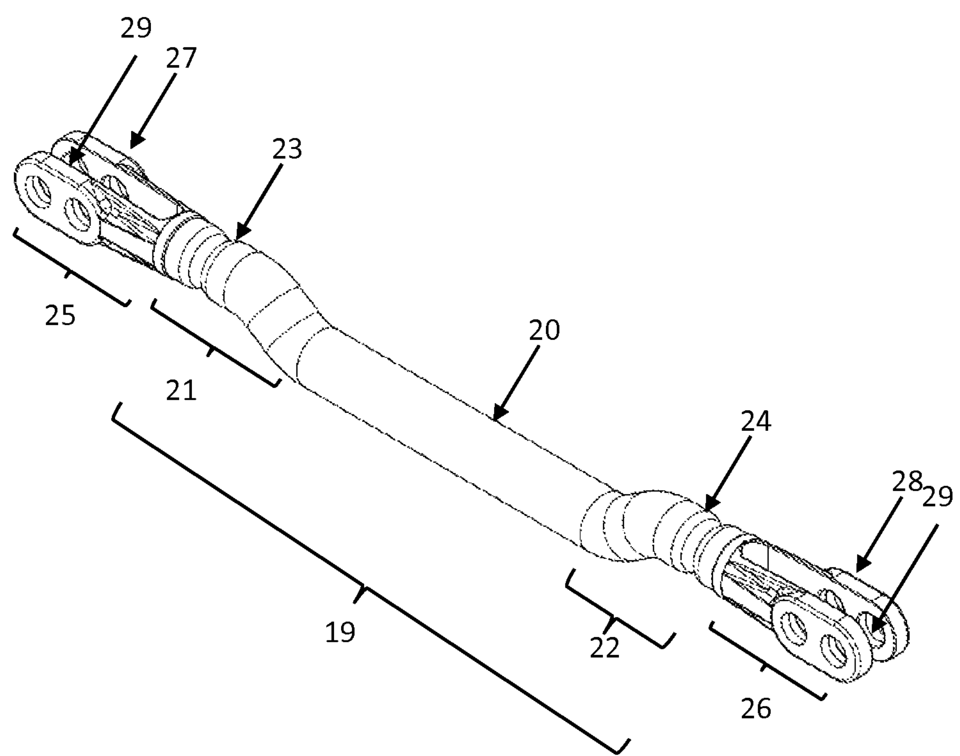
FIG. 5 is a perspective view of a second embodiment of the connecting rod of the present invention.

In a first embodiment shown in FIGS. 3, 4 and 5 the connecting rod of the present invention comprises:

a straight hollow steel pipe 6 having a first 7 and a second open end 8;

a first 9 and a second 10 linking means, each comprising a bracket member 11 for connecting to a respective lever 1, 2, by means of a bolt (not shown) passing through the perforations 12 having a cylindrical coupling section 13 having an annular profile forming a peripheral bump section 14 and one annular groove 15 having a central annular ring 16;

wherein the cylindrical coupling section 13 of the first linking means 9 is retained inside the first open end 7 by means of a pressure fit joint in which the cylindrical wall 17 of said first open end 7 conforms to the shape of the annular profile said cylindrical coupling section 13, and wherein the peripheral edge 18 of said first open end bumps on the peripheral bump section 14;

wherein the cylindrical coupling section 13 of the second linking means 10 is retained inside the second open end 8 by means of a pressure fit joint in which the cylindrical wall of said second open end 8 conforms to the shape of the annular profile of said cylindrical coupling section, and wherein the peripheral edge of said second open end bumps on the peripheral bump section.

Figure 6:
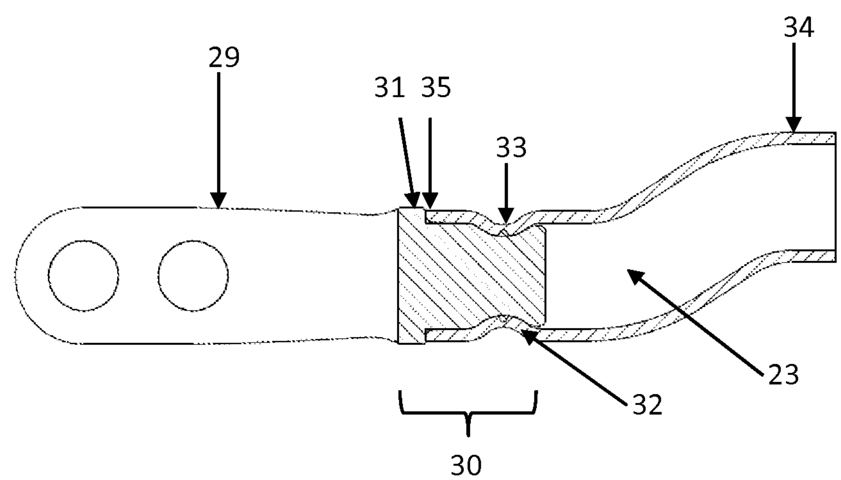
FIG. 6 is a view of a longitudinal cut of the first open end and of the first linking means joined to said first open end of a second embodiment of the connecting rod of the present invention.
Figure 7:
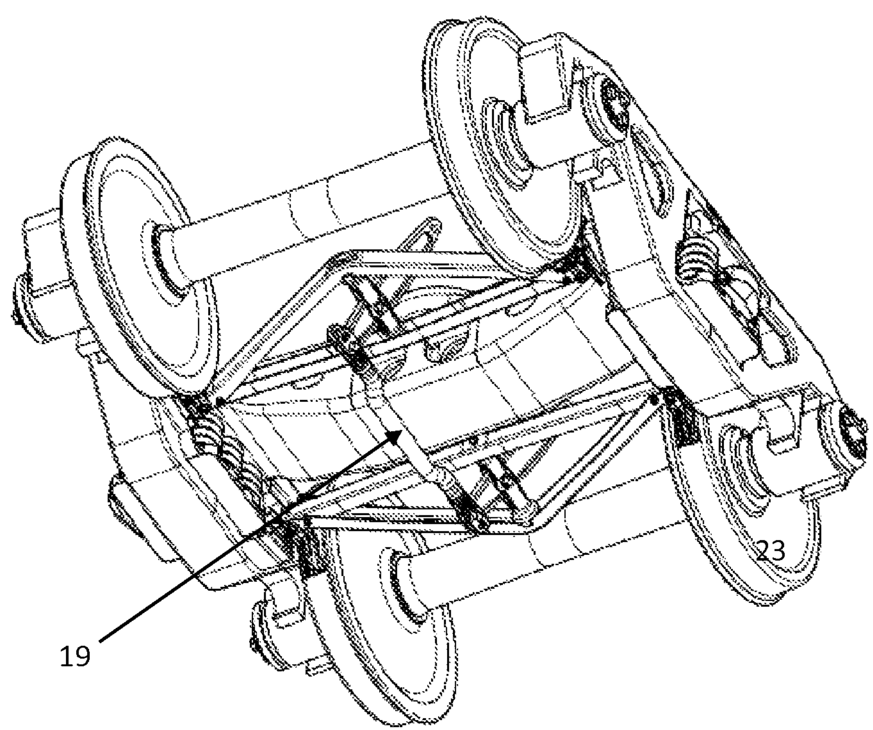
FIG. 7 is a lower perspective view of the truck of a railway car showing its brake rigging and a second embodiment of the connecting rod of the present invention installed in the truck.

In a second embodiment, shown in FIGS. 5 and 6, the connecting rod of the present invention comprises:

a hollow steel pipe 19 having a central straight section 20 a first 21 and a second end bent sections 22 and a first 23 and a second 24 open end;

a first 25 and a second linking means 26, each comprising a bracket member 27, 28 for connecting to a respective lever 1, 2 by means of a bolt (not shown) passing through the perforations 29, having a cylindrical coupling section 30 having an annular profile forming a peripheral bump section 31 and one annular groove 32 having a central annular ring 33;

wherein the cylindrical coupling section of the first linking means 25 is retained inside the first open 23 end by means of a pressure fit joint in which the cylindrical wall 34 of said first open end 23 conforms to the shape of the annular profile of said cylindrical coupling section 30, and wherein the peripheral edge 35 of said first open end 23 bumps on the peripheral bump section;

wherein the cylindrical coupling section of the second linking means 26 is retained inside the second open end 24 by means of a pressure fit joint in which the cylindrical wall of said second open end 24 conforms to the shape of the annular profile of said cylindrical coupling section, and wherein the peripheral edge of said second open end 24 bumps on the peripheral bump section;

The end bent sections 21, 22 allow the hollow steel pipe to conform to the shape of the truck and to be installed below the truck as shown in FIG. 7.

It has to be understood that the cross section of the hollow steel pipe may have any shape, such as quadrangular.

In the same way, the cross section of the coupling section of the linking means may have any shape adequate to be inserted inside the open ends of the hollow pipe, and the coupling sections may have any profile.

The linking means may be retained at the ends of the hollow pipe in such way that they are completely fixed or be able to rotate.

In an alternative embodiment (not shown) the rod may be made of a lightweight material and be completely solid. In such embodiment the ends of the rod may include coupling sections having a specific profile, and the linking means may have an open end in which the coupling sections are retained by means of a pressure joint fit in such way that the walls of the open ends of the linking means conform to the shape of the profile of the correspondent coupling section.

It should be finally understand that the connecting rod, of the present invention, is not limited to the embodiments formerly described and that the persons skilled in the art will be able, by the teachings herein disclosed, to carry out changes in the connecting rod, of the present invention, which will be within the true scope of the invention, which will be set forth exclusively by the following claims.

The invention claimed is:

1. A connecting rod utilized to operate brake levers and brake beams in brake riggings of railway cars comprising:

a hollow pipe having a first and a second end;

a first and a second linking means, each having a coupling section having a profile shape;

wherein the coupling section of the first linking means is retained inside the first open end by means of a pressure fit joint in which the wall of said first open end conforms to the shape of the profile of said coupling section; and wherein the cylindrical coupling section of the second linking means is retained inside the second open end by means of a pressure fit joint in which the wall of said second open end conforms to the shape of the profile of said cylindrical coupling section.

2. A connecting rod as claimed in claim 1, wherein the linking means comprising a bracket member for connecting to a respective lever.

3. A connecting rod as claimed in claim 1, wherein the coupling section of each linking means comprising a cylindrical member having an annular profile.

4. A connecting rod as claimed in claim 1, wherein:

the first and second open ends of the hollow pipe have a circular shaped cross section;

the coupling section of each linking means comprising a cylindrical member having an annular profile forming a peripheral bump section and one annular groove having a central annular ring;

wherein the cylindrical coupling section of the first linking means is retained inside the first open end by means of a pressure fit joint in which the cylindrical wall of said first open end conforms to the shape of the annular profile of said cylindrical coupling section, and wherein the peripheral edge of said first open end bumps on the peripheral bump section; and wherein the cylindrical coupling section of the second linking means is retained inside the second open end by means of a pressure fit joint in which the cylindrical wall of said second open end conforms to the shape of the annular profile of said cylindrical coupling section, and wherein the peripheral edge of said second open end bumps on the peripheral bump section.

5. A connecting rod as claimed in claim 1, wherein the hollow steel pipe having a central straight section a first and a second end bent sections and a first and a second open end.

6. A connecting rod as claimed in claim 1, wherein the hollow steel pipe and the first and second open end have a polygonal shaped cross section.

7. A connecting rod as claimed in claim 1, wherein the coupling section of the linking means having a polygonal shaped cross section.

8. A connecting rod as claimed in claim 1, wherein the coupling section of both linking means are fixedly retained inside the first open end.

9. A connecting rod as claimed in claim 1, wherein the coupling section of both linking means are rotary retained inside the correspondent open end.

10. A connecting rod as claimed in claim 1, wherein at least one coupling section of a linking means is rotary retained inside the correspondent open end.

* * * * *